USOO9600831B1

United States Patent
Chou et al.

(10) Patent No.: US 9,600,831 B1
(45) Date of Patent: Mar. 21, 2017

(54) USER ASSOCIATION ATTRIBUTION SYSTEM

(75) Inventors: Linus Chou, San Francisco, CA (US); Jonathan Klem, Oak Park, IL (US); James H. Koh, Chicago, IL (US); James E. Stewart, Mountain View, CA (US); Eric W. Ewald, Gilroy, CA (US); Andrey Petrov, San Jose, CA (US); Carolyn R. Marshall, Stratford (CA); Paul Sliwowski, San Francisco, CA (US); Paul J. Baker, Chicago, IL (US); Maciej Babinski, Chicago, IL (US); Jige Yu, Northbrook, IL (US); Jacob B. Matthews, Chicago, IL (US)

(73) Assignee: Google Inc., Mountain View, CA (US)

( * ) Notice: Subject to any disclaimer, the term of this patent is extended or adjusted under 35 U.S.C. 154(b) by 1221 days.

(21) Appl. No.: 13/600,120

(22) Filed: Aug. 30, 2012

Related U.S. Application Data

(60) Provisional application No. 61/663,514, filed on Jun. 22, 2012.

(51) Int. Cl.
*G06F 15/16* (2006.01)
*G06Q 30/02* (2012.01)

(52) U.S. Cl.
CPC ..... *G06Q 30/0242* (2013.01); *G06Q 30/0246* (2013.01)

(58) Field of Classification Search
CPC ........... G06Q 30/0242; G06Q 30/0246; G06Q 30/0243; G06Q 30/02
See application file for complete search history.

(56) References Cited

U.S. PATENT DOCUMENTS

| | | | | |
|---|---|---|---|---|
| 2008/0070209 A1* | 3/2008 | Zhuang | .................. | G06Q 10/10 434/236 |
| 2009/0307022 A1* | 12/2009 | Babazadeh | .......... | G06Q 10/063 705/7.39 |
| 2010/0262477 A1* | 10/2010 | Hillerbrand | ............ | G06Q 30/02 705/14.16 |
| 2011/0264491 A1* | 10/2011 | Birnbaum | ............... | G06F 3/016 705/14.4 |
| 2012/0150955 A1* | 6/2012 | Tseng | ...................... | H04L 51/22 709/204 |

(Continued)

*Primary Examiner* — Philip Chea
*Assistant Examiner* — Mohammed Ahmed
(74) *Attorney, Agent, or Firm* — McDermott Will & Emery LLP

(57) ABSTRACT

A system for user association attribution may include one or more processors and memory. The one or more processors may receive information pertaining to relationship events that each correspond to a participant and one of several entities in a social network, allocate, for each relationship event, attribution values to touchpoints accessed by the corresponding entity prior to the relationship event. The processors may further determine a weight for each of the attribution values allocated to each of the touchpoints, where the weight for each of the attribution values is based at least in part on each of the relationship events for which each of the attribution values was allocated, generate an aggregate attribution value for each of the touchpoints based at least in part on the weighted attribution values allocated to each of the touchpoints, and provide, to the participant, each aggregate attribution value generated for each of the touchpoints.

25 Claims, 6 Drawing Sheets

(56) References Cited

U.S. PATENT DOCUMENTS

2013/0332264 A1* 12/2013 Chittilappilly ......... G06Q 30/02
                                                                              705/14.45
2015/0161652 A1* 6/2015 Schnabl ............. G06Q 30/0242
                                                                              705/14.41

* cited by examiner

USER ASSOCIATION ATTRIBUTION SYSTEM

CROSS-REFERENCE TO RELATED APPLICATIONS

The present application claims the benefit of U.S. Provisional Patent Application Ser. No. 61/663,514, entitled "User Association Attribution System," filed on Jun. 22, 2012, which is hereby incorporated by reference in its entirety for all purposes.

TECHNICAL FIELD

The present description relates generally to an attribution system, and more particularly, but not exclusively, to a user association attribution system.

BACKGROUND

In a social network system, multiple users may associate themselves with, or disassociate themselves from, a particular participant in the social network. The social network system may provide a participant with a notification when users associate themselves with, or disassociates themselves from, the participant. The social network system may further provide the participant with the total number of users presently associated with the participant in the social network. However, the participant in the social network may be unable to determine what caused the users to associate themselves with, or disassociate themselves from, the participant in the social network.

SUMMARY

The disclosed subject matter relates to a computer-implemented method for user association attribution. The method may include receiving, using one or more computing devices, information pertaining to a plurality of relationship events that each correspond to a participant and one of a plurality of entities in a social network, allocating, using the one or more computing devices and for each of the plurality of relationship events, a plurality of attribution values to a plurality of touchpoints accessed by the corresponding entity of the plurality of entities prior to each of the plurality of relationship events, determining, using the one or more computing devices, a weight for each of the plurality of attribution values allocated to each of the plurality of touchpoints, wherein the weight for each of the plurality of attribution values is based at least in part on each of the plurality of relationship events for which each of the plurality of attribution values was allocated, generating, using the one or more computing devices, an aggregate attribution value for each of the plurality of touchpoints based at least in part on the weighted attribution values allocated to each of the plurality of touchpoints, and providing, using the one or more computing devices and to the participant, each aggregate attribution value generated for each of the plurality of touchpoints.

In another aspect, a computer-implemented method for user association attribution may include receiving, using one or more computing devices, an indication of a relationship event corresponding to a participant and an entity in a social network, determining, using the one or more computing devices and from session information corresponding to the entity, a plurality of touchpoints accessed by the entity within an attribution time window prior to the relationship event and a time when each of the plurality of touchpoints was accessed by the entity, allocating, using the one or more computing devices, an attribution value to each of the plurality of touchpoints based at least in part on a temporal proximity of the relationship event to the time when each of the plurality of touchpoints was accessed by the entity, wherein the allocated attribution value for each of the plurality of touchpoints comprises a first sign when the relationship event comprises a first relationship event and the allocated attribution value for each of the touchpoints comprises a second sign that is opposite of the first sign when the relationship event comprises a second relationship event, and providing, using the one or more computing devices and to the participant, the attribution value allocated to each of the plurality of touchpoints corresponding to the relationship event.

In another aspect, a computer-implemented method for graphical representation of multivariate datasets may include determining, using one or more computing devices, a cardinality of each of a plurality of variables in a plurality of data records, selecting, using the one or more computing devices, a first variable of the plurality of variables, wherein the first variable has a lowest cardinality of the plurality of variables in the plurality of data records, generating, using the one or more computing devices, a first graphical display comprising a plurality of first graphical indicators representative of a plurality of first values of the first variable in the plurality of data records, selecting, using the one or more computing devices, a second variable of the plurality of variables, wherein the second variable has a lowest remaining cardinality of the plurality of variables in the plurality of data records, generating, using the one or more computing devices, a plurality of second graphical displays that each corresponds to one of the plurality of first values of the first variable, wherein each of the plurality of second graphical displays comprises a plurality of second graphical indicators representative of the second values of the second variable for the one of the plurality of first values of the first variable in the plurality of data records, assembling, using the one or more computing devices, a graphical representation of the plurality of data records by combining the first graphical display and the plurality of second graphical displays such that at least two of the plurality of second graphical displays are aligned across an axis that runs through the first graphical display, and providing, using the one or more computing devices, the graphical representation of the plurality of data records.

The disclosed subject matter also relates to a system for user association attribution. The system may include one or more processors and a memory including instructions that, when executed by the one or more processors, cause the one or more processors to receive information pertaining to a plurality of relationship events that each correspond to a participant and one of a plurality of entities in a social network, allocate, for each of the plurality of relationship events, a plurality of attribution values to a plurality of touchpoints accessed by the corresponding entity of the plurality of entities prior to each of the plurality of relationship events, determine a weight for each of the plurality of attribution values allocated to each of the plurality of touchpoints, wherein the weight for each of the plurality of attribution values is based at least in part on each of the plurality of relationship events for which each of the plurality of attribution values was allocated, generate an aggregate attribution value for each of the plurality of touchpoints based at least in part on the weighted attribution values allocated to each of the plurality of touchpoints, and provide, to the participant, each aggregate attribution value generated for each of the plurality of touchpoints.

The disclosed subject matter also relates to a machine-readable medium comprising instructions stored therein, which when executed by a machine, cause the machine to perform a method for user association attribution that includes receiving an indication of a relationship event corresponding to a participant and an entity in a social network, determining, from session information corresponding to the entity, a plurality of touchpoints accessed by the entity within an attribution time window prior to the relationship event and a time when each of the plurality of touchpoints was accessed by the entity, allocating an attribution value to each of the plurality of touchpoints based at least in part on a temporal proximity of the relationship event to the time when each of the plurality of touchpoints was accessed by the entity, wherein the allocated attribution value for each of the plurality of touchpoints comprises a first sign when the relationship event comprises a first relationship event and the allocated attribution value for each of the touchpoints comprises a second sign that is opposite of the first sign when the relationship event comprises a second relationship event, and providing, to the participant, the attribution value allocated to each of the plurality of touchpoints corresponding to the relationship event.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
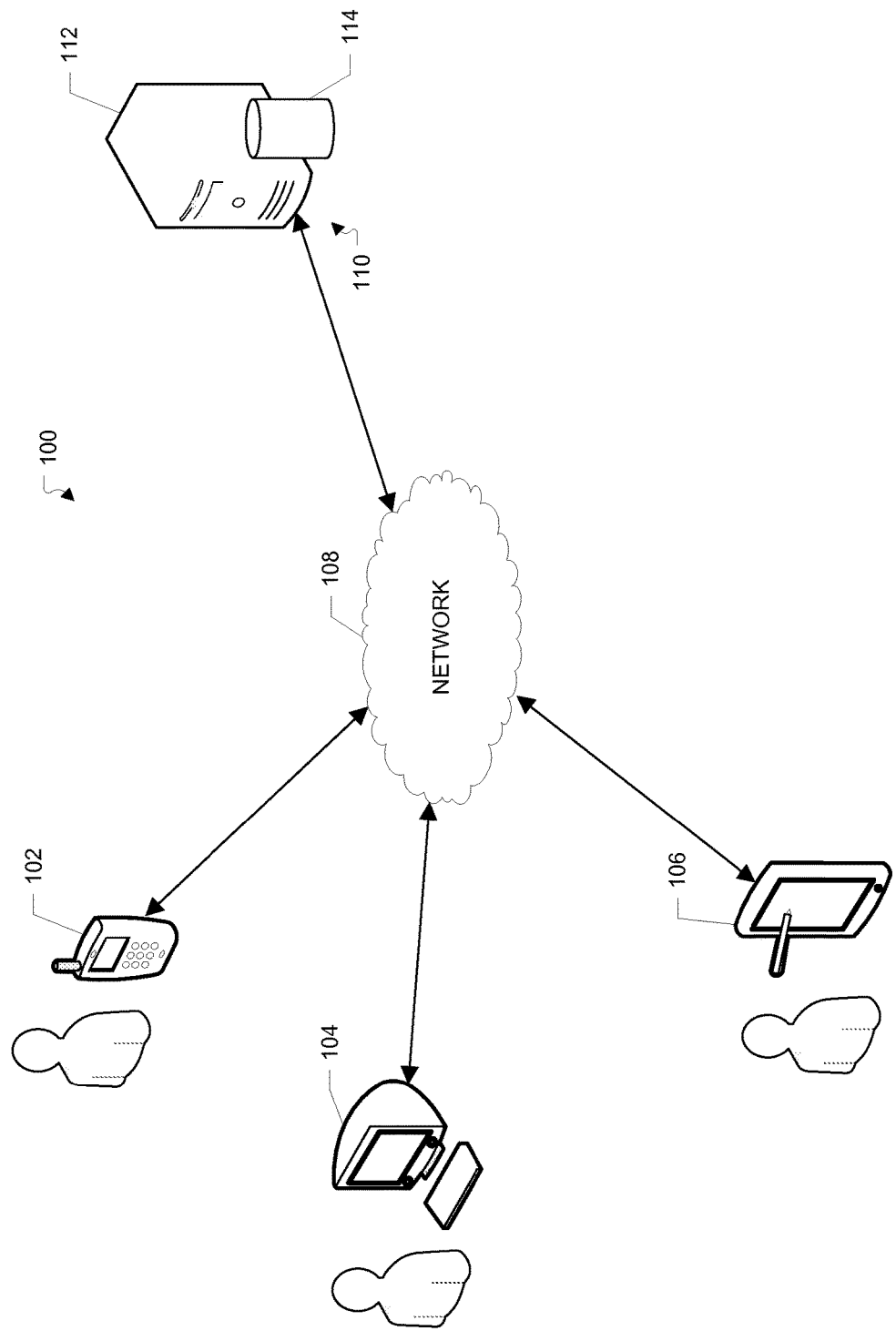
FIG. 1 illustrates an example client-server network environment that may implement a user association attribution system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

In a social network system, users may chose to associate or disassociate themselves with other users or entities within the social network. For example, a user may chose to "follow," or "friend," another user or entity in the social network, such as in order to receive information updates from the another user or entity. Conversely, a user may chose to "unfollow," or "defriend," another user or entity in the social network that the user previously associated themselves with, such as in order to stop receiving information updates from the another user or entity. Thus, for a given participant in a social network system, there may be a number of users and/or entities in the social network that have associated themselves with, or disassociated themselves from, the participant.

The social network system may provide the participant with the total number of users presently associated with the participant, e.g. the total number of users that have associated themselves with the participant minus the total number of users that have disassociated themselves from the participant. However, the social network system may not provide the participant with any indication of what caused the users to associate/disassociate themselves with/from the participant. Since there may be many different ways in which the users may have been inspired to associate themselves with, or disassociate themselves from, the participant in the social network, e.g. viewing a public post created by the participant, clicking on a badge on an external website corresponding to the participant, or searching for the participant in the social network, it may be desirable to provide the participant with an indication of what caused the users to associate/disassociate themselves with/from the participant, such that the participant can identify content and/or campaigns that may have a positive or negative impact in the social network.

In a user association attribution system, conversion attribution techniques that are used in display advertising may be applied in the context of a social network system in order to attribute relationship events corresponding to a participant, e.g. association events that occur when another user associates themselves with the participant, or disassociation events that occur when another user disassociates themselves from the participant. The occurrence of a relationship event may be attributed to one or more touchpoints that were accessed by the user prior to the occurrence of the relationship event. The touchpoints may be any content that is created and/or controlled by the participant, such as content that the user may view and/or interact with, in addition to references to any such content, such as a reference to any such content in a message posted by another user. Similar to display advertising, the amount of attribution allocated to a given touchpoint may be dependent upon the temporal proximity of the relationship event to the time when the touchpoint was accessed by the user. For example, a touchpoint that was accessed immediately prior to the relationship event may be allocated more attribution than a touchpoint that was accessed temporally further from the relationship event.

In one example, a participant may post a message, such as on a message board, regarding their favorite sports team. The message may be subsequently viewed by a user that is associated with the participant. If the user that viewed the message is a fan of a rival sports team, the user may disassociate themselves from the participant upon reading the participant's message. Since the message posted by the participant was accessed by the user immediately prior to disassociating themselves from the participant, and therefore the message was most likely the cause of the user disassociating themselves from the participant, the message posted by the participant may be allocated more attribution than other touchpoints of the participant that may have been accessed by the user prior to viewing the message and thus prior to disassociating themselves from the participant.

Accordingly, the occurrence of a relationship event in a social network system may be attributed to touchpoints in a similar manner as the attribution of a conversion event to advertisements or other content in display advertising. Furthermore, similar to determining the effectiveness of a display advertisement, the effectiveness of a touchpoint may be determined by aggregating the attribution allocated to the touchpoint over a period of time. However, although a relationship event corresponding to a user association may be considered a positive outcome, or a desirable outcome, similar to a conversion event in display advertising, a relationship event corresponding to a user disassociation may be considered a negative, or undesirable outcome, which may not have a corollary in display advertising. Thus, the aggregation of attribution allocated to a touchpoint for both association events and disassociation events may not accurately reflect the effectiveness of the touchpoint in the social network system, e.g. since the aggregation does not reflect that the association events may be considered positive, or desirable, outcomes, while the disassociation events may be considered negative, or undesirable, outcomes. Accordingly, in a social network system it may be desirable to aggregate the attribution allocated to a touchpoint differently than the aggregation of attribution allocated to an advertisement in a display advertising system.

In the subject user association attribution system, the attribution allocated to touchpoints for positive outcomes, such as user associations, are aggregated differently than the attribution allocated to touchpoints for negative outcomes, such as user disassociations, such that the aggregation of the attribution allocated to the touchpoints accurately reflects the effectiveness of the touchpoints in the social network system. For example, attribution allocated to a touchpoint for a positive outcome, such as a user association, may be weighted with a first weight, such as a positive value, and then aggregated, while attribution allocated to a touchpoint for a negative outcome, such as a user disassociation, may be weighted with a second weight, such as a negative value, and then aggregated. Accordingly, the user association attribution system aggregates the attribution allocated to a touchpoint in a manner that accurately reflects the touchpoint's overall effectiveness in the social network system.

For example, upon determining that a relationship event corresponding to a participant in a social network has occurred, such as a user associating themselves with the participant (association event), or a user disassociating themselves from the participant (disassociation event), the user association attribution system may analyze session data for the user that initiated the relationship event, such as to identify touchpoints accessed by the user prior to the relationship event. The system may filter the touchpoints identified from the session data to exclude touchpoints that were accessed outside of an attribution time window prior to the relationship event, so as to exclude touchpoints that minimally attributed to the occurrence of the relationship event. The system may allocate attribution to the remaining touchpoints as a function of the temporal proximity of the relationship event to the time when the touchpoints were accessed by the user. For example, the amount of attribution allocated to the touchpoints may decrease proportionally to a decrease in the temporal proximity of the relationship event to the time when the touchpoints were accessed by the user.

The system may also determine whether the relationship event was an association event or a disassociation event. In the instance of an association event, the system may allocate the attribution to the touchpoints as positive values; however, in the instance of a disassociation event, the system may allocate the attribution to the touchpoints as negative values. Upon allocating the attribution to the touchpoints, the system may provide the participant with an indication of the attribution allocated to each of the touchpoints, and/or the system may store the attribution allocated to each of the touchpoints, such as in a database.

It may also be desirable to provide the participant with information regarding the aggregate attribution allocated to the touchpoints relative to various user demographic information such that the participant can determine whether a given touchpoint is more or less effective with regards to particular user demographics. Accordingly, it may be desirable to provide the participant with a graphical representation of a multivariate dataset, such as user demographic information for a given touchpoint, that enables the participant to quickly understand the relationships between the variables of the dataset. For example, there may be multiple interrelated variables associated with user demographic information for a given touchpoint, such as age, gender, ethnicity, etc. Accordingly, it may be desirable to provide a graphical representation of the user demographic information that enables the participant to quickly understand the relationships between the variables, e.g., the age and gender of the users, with regards to the effectiveness of a given touchpoint. However, a given user's demographic information may not be included in the graphical representation unless the user has been given notice and/or has provided assent for such sharing of information.

In the subject system for graphical representation of multivariate datasets, two variables are selected from a multivariate set of data records, such as user demographic information. For example, the system may select the two variables of the multivariate set of data records that have the lowest cardinality, such as gender and age groups for user demographic information. Alternatively, or in addition, the variables may be selected based at least in part on preferences identified by the participant. The system then generates a first graphical display, such as a donut chart, that is representative of a first variable of the selected variables that has the lowest cardinality, such as gender for user demographic information. The first graphical display may include a first graphical indicator for each of at least two first values of the first variable, such as the two values of the first variable having the highest commonality, e.g. male and female for gender. In one example, the first graphical indicator for each first value may represent a percentage of the data records that corresponds to each first value, e.g. the percentage of the user demographic information that corresponds to male users and the percentage of the user demographic information that corresponds to female users.

The system then generates, for each first value of the first variable, a second graphical display, such as a histogram, that includes a second graphical indicator for each of the second values of the second variable respective to each first value of the first variable. The second graphical displays may each use the same units of measurement, e.g. percent, and may be determined relative to the entire set of data records, such that the second graphical indicators can be visually compared across each of the second graphical displays. In one example, the system may only generate second graphical displays for the two values of the first variable that have the highest commonality. In the example of gender corresponding to the first variable and age group corresponding to the second variable, the system may generate second graphical displays that include second graphical indicators for each age group represented in the user demographic information, where one of the second graphical displays represents the age groups of female users and another second graphical display represents the age groups of male users.

The system then combines the first graphical display and the second graphical displays to build a graphical representation of the multivariate dataset. The graphical displays may be combined such that at least two of the second graphical displays are aligned across a common axis that runs through the first graphical display. By combining the graphical displays in this manner, the values of each of the second graphical displays can be visually compared against one another. For example, the system may align the second graphical displays corresponding to the two first values of the first variable that have the highest commonality, such as male and female for gender. The system then may provide the graphical representation to a viewer. In the example where the units of measurement are in percents, the system may also provide the total number of data records such that a viewer can determine the raw numbers that correspond to each of the percents.

II. Example Client-Server Network Environments for a User Association Attribution System FIG. 1 illustrates an example client-server network environment which may implement endpoint device-specific stream control for multimedia conferencing. Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for displaying a web page or web application. In the example of FIG. 1, electronic device 102 is depicted as a desktop computer, electronic device 104 is depicted as a smartphone, and electronic device 106 is depicted as a tablet device.

In one example, server 110 includes one or more processing devices 112 and data store 114. The one or more processing devices 112 execute computer instructions stored in data store 114, for example, to provide user association attribution values to one or more of electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, electronic devices 102, 104, 106 may be in communication with one another without communicating with server 110.

Users interacting with electronic devices 102, 104, 106 may participate in a social network system, such as a social network system provided by server 110. Alternatively, or in addition, participants or entities in the social network may be corporate entities, such as entities associated with a corporation, rather than individual users. The users interacting with electronic devices 102, 104, 106 may associate themselves with, or disassociate themselves from, other users in the social network. In addition, other users in the social network may associate themselves with, or disassociate themselves from, the users interacting with one of the electronic devices 102, 104, 106. The association of an entity in the social network, such as a first user interacting with one of the electronic devices 102, 104, 106, to a participant in the social network, such as a second user interacting with one of the electronic devices 102, 104, 106, may be referred to as an association event corresponding to the participant. Similarly, the disassociation of an entity in the social network from a participant in the social network may be referred to as a disassociation event corresponding to the participant. The association events and disassociation events corresponding to a participant may be collectively referred to as relationship events corresponding to the participant.

The phrase "relationship event" as used herein encompasses its plain and ordinary meaning and, if not otherwise included in its plain and ordinary meaning, may also refer to any interactions between an entity and a participant in a social network that are initiated by the entity, such as the entity associating themselves with the participant, e.g. an association event, the entity disassociating themselves from the participant, e.g. a disassociation event, the entity ignoring the participant, the entity liking the participant, or generally any other interaction in the context of a social network that may be initiated by the entity and may correspond to the participant.

A user interacting with one of the electronic devices 102, 104, 106 may associate themselves with, or disassociate themselves from a participant in the social network for one or more reasons. For example, the user may view or interact with content created by the participant, such as the participant's profile in the social network, messages posted by the participant in the social network, or content created by the participant external to the social network. Thus, the occurrence of a relationship event corresponding to a participant, such as an entity associating themselves with the participant, may be attributed to one or more items pertaining to the participant, or touchpoints, that were accessed by the entity prior to the occurrence of the relationship event.

The phrase "touchpoint" as used herein encompasses its plain and ordinary meaning and, if not otherwise included in its plain and ordinary meaning, may also refer to any content that is created and/or controlled by the participant, such as content internal or external to a social network that an entity may view and/or interact with, e.g. a profile page, a badge, a post in a forum, etc., in addition to references to any such content, such as a reference to any such content in a message posted by another user, a reference to any such content in a search result, or any other reference to any such content.

Server 110 may identify when a relationship event initiated by an entity and corresponding to a participant occurs, such as by receiving an indication that the relationship event has occurred. Upon identifying that a relationship event has occurred, server 110 may process session data of the entity that initiated the relationship event. Server 110 may determine, from the processed session data, the touchpoints accessed by the entity prior to the occurrence of the relationship event. Server 110 may allocate an attribution value to each of the touchpoints, such as based on the temporal proximity of when the touchpoint was accessed by the entity to the time that the relationship event occurred. Server 110 may also determine the type of relationship event that occurred, such as whether the relationship event was an association event or a disassociation event. If the relationship event was a disassociation event, server 110 may weight each of the allocated attribution values with a first value, such as negative value, e.g. −1. Conversely, if the relationship event was an association event, server 110 may weight each of the allocated attribution values with a second value, such as a positive value, e.g. 1. Server 110 may then store the weighted attribution value allocated to each of the touchpoints, such as in data store 114.

At periodic intervals, such as at daily intervals, server 110 may aggregate the weighted attribution values allocated to each of the touchpoints for the relationship events corresponding to one or more participants in the social network system. Server 110 may then provide the aggregated attribution values of each touchpoint to the participant, such as a user interacting with one of the electronic devices 102, 104, 106. The aggregated attribution values of each touchpoint may provide the user with an indication of the overall effectiveness of each touchpoint in the social network system. Alternatively, or in addition, server 110 may provide the participant, such as a user interacting with one of the electronic devices 102, 104, 106, with a graphical display corresponding to the demographic information of the entities in the social network that are presently associated with the participant, such as the user interface illustrated in FIG. 5.

III. Example Processes for a User Association Attribution System

Figure 2:
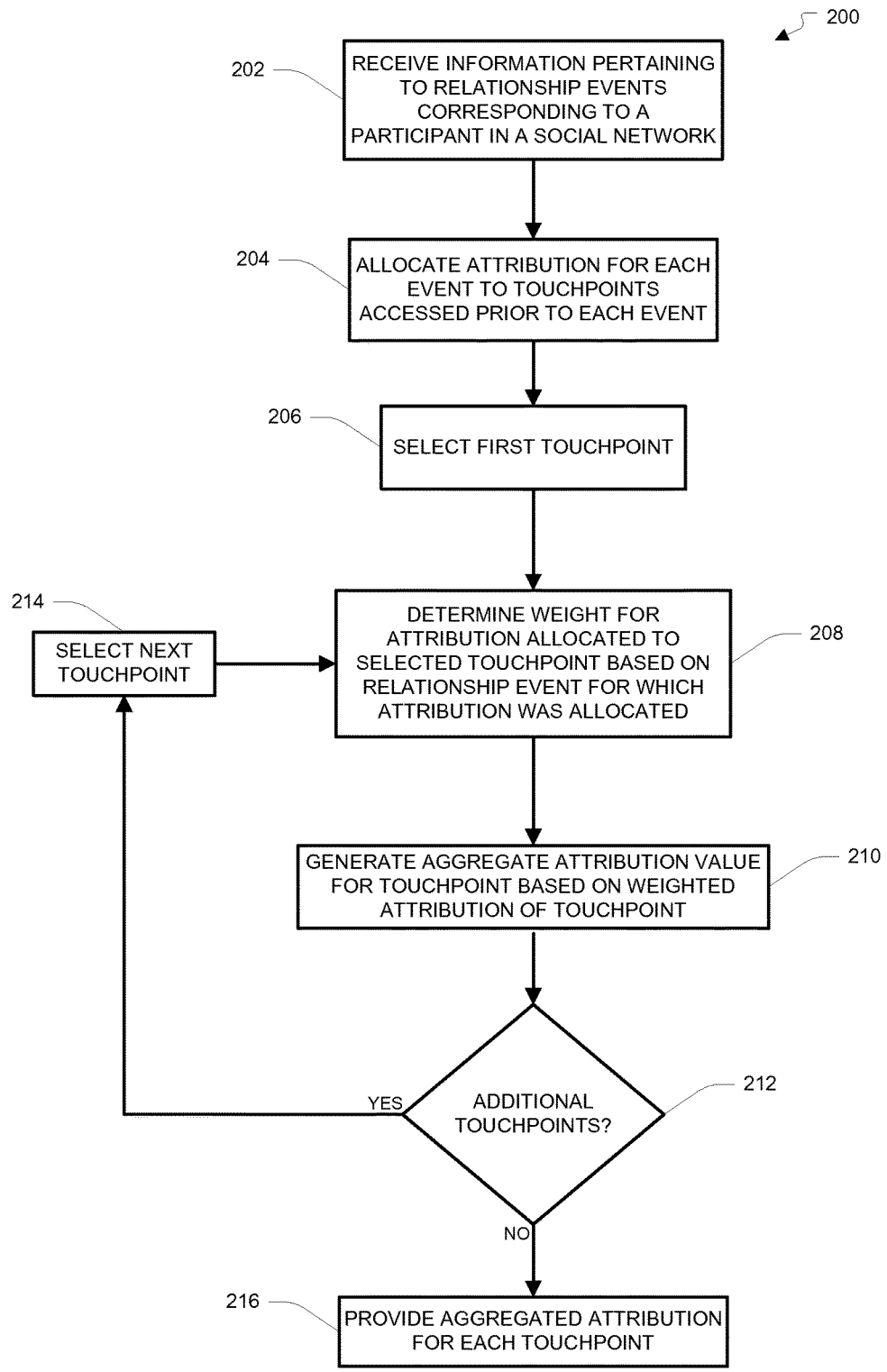
FIG. 2 illustrates a flow diagram of an example process for a user association attribution system.

FIG. 2 illustrates a flow diagram of an example process 200 for a user association attribution system. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel.

In block 202, a computing device, such as server 110, receives information pertaining to relationship events corresponding to a participant in a social network. For example, server 110 may receive the information pertaining to the relationship events from the data store 114, or from another server. In block 204, server 110 allocates attribution values for each relationship event to the touchpoints accessed by the entity that initiated each relationship event prior to the occurrence of each relationship event. Server 110 may determine the touchpoints accessed prior to each relationship event from session data of the entity that initiated each relationship event. In one example, the session data may be part of the information pertaining to the relationship events that is received by server 110 in block 202.

In one example, server 110 may allocate attribution values equally to each of the touchpoints that were accessed by the entity within a threshold period prior to the occurrence of the relationship event, such that any touchpoints that were accessed outside of the threshold period are not allocated any attribution. For example, if four touchpoints were accessed by the entity within a threshold period prior to the occurrence of the relationship event, one-fourth of the attribution would be allocated to each of the touchpoints, such as an attribution value of 0.25. In another example, server 110 may allocate attribution values to each of the touchpoints based at least in part on one or more factors, such as a temporal proximity of a time when the touchpoint was accessed by the entity to the occurrence of the relationship event. For example, the amount of attribution value allocated to the touchpoints may decrease proportionally to an decrease in the temporal proximity of the time that the touchpoint was accessed to the occurrence of the relationship event.

In block 206, server 110 may select the first touchpoint that was allocated attribution value for one or more of the relationship events. In block 208, server 110 determines weights for the attribution values allocated to the touchpoint based on the relationship events for which the attribution values were allocated. For example, if an attribution value was allocated to a touchpoint for an association event, server 110 may weight the attribution value with a first weight, such as a positive value, e.g. 1. Alternatively, if an attribution value was allocated to a touchpoint for a disassociation event, server 110 may weight the attribution value with a second weight, such as a negative value, e.g. −1.

In block 210, server 110 may generate an aggregate attribution value for the touchpoint based on the weighted attribution values of the touchpoint. For example, server 110 may aggregate the weighted attribution values of the touchpoint to generate the aggregate attribution value for the touchpoint. In block 212, server 110 may determine whether there are any additional touchpoints that were allocated attribution value that has not been weighted. If, in block 212, server 110 determines that there are additional touchpoints that were allocated attribution value that has not been weighted, server 110 moves to block 214. In block 214, server 110 selects the next touchpoint that was allocated attribution value that has not been weighted and repeats blocks 208-210 for the selected touchpoint.

If, in block 212, server 110 determines that there are no additional touchpoints that were allocated attribution values that have not been weighted, server 110 moves to block 216. In block 216, server 110 provides the aggregated attribution values of each of the touchpoints to the participant to which the relationship events correspond. For example, server 110 may provide a graphical display to the participant that presents the aggregated attribution values of each of the touchpoints, such as on one of the electronic devices 102, 104, 106.

Figure 3:
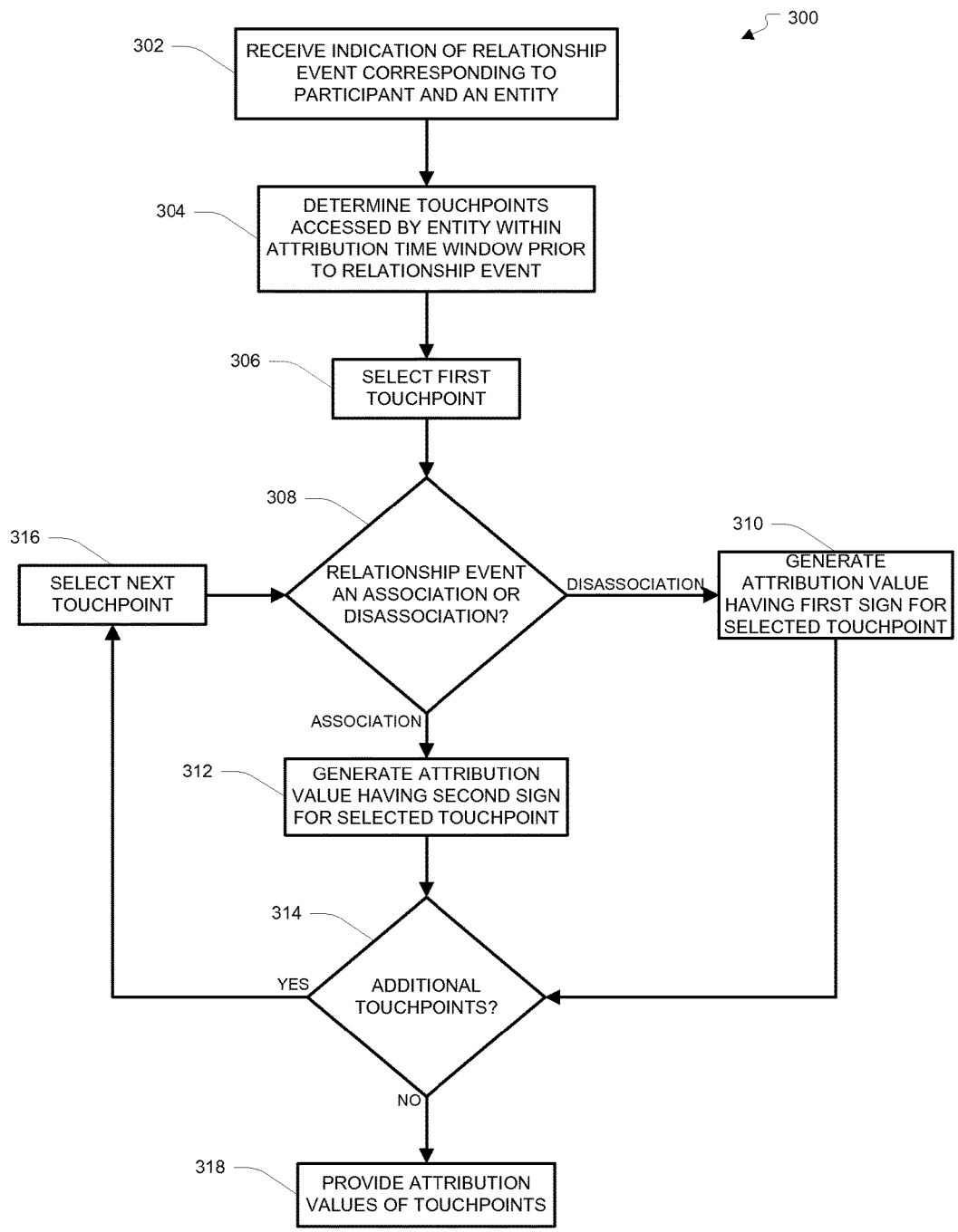
FIG. 3 illustrates a flow diagram of an example process for a user association attribution system.

FIG. 3 illustrates a flow diagram of an example process 300 for a user attribution system. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel.

In block 302, server 110 may receive an indication of a relationship event corresponding to a participant and an entity, or may otherwise determine that a relationship event corresponding to the participant and the entity has occurred. For example, server 110 may receive a notification when a relationship event occurs in a social network, e.g. when an entity associates themselves with, or disassociates themselves from, the participant in the social network. In block 304, server 110 may determine the touchpoints that were accessed by the entity within an attribution time window prior to the occurrence of the relationship event. For example, the attribution time window may be five minutes, one hour, or any time period, such that any touchpoints accessed outside of the attribution time window can be excluded from the attribution allocation for the relationship event.

In block 306, server 110 may select the first touchpoint from the touchpoints determined in block 304. In block 308, server 110 may determine whether the relationship event that occurred was an association event, such as the entity associating themselves with the participant in the social network, or a disassociation event, such as the entity disassociating themselves from the participant in the social network.

If, in block 308, server 110 determines that the relationship event that occurred was a disassociation event, server 110 moves to block 310. In block 310, server 110 generates an attribution value for the selected touchpoint that has a first sign, such as a negative sign. Server 110 may generate the magnitude of the attribution value based on one or more factors, such as the temporal proximity of the time when the entity accessed the touchpoint to the occurrence of the relationship event. Alternatively, or in addition, server 110 may allocate the attribution for the relationship event evenly across all of the touchpoints determined in block 304.

If, in block 308, server 110 determines that the relationship event that occurred was an association event, server 110 moves to block 310. In block 310, server 110 generates an attribution value for the selected touchpoint that has a second sign that is opposite of the first sign. Accordingly, if the first sign was a negative sign, then the second sign would be a positive sign, and vice-versa. Server 110 may generate the magnitude of the attribution value based on one or more factors, such as the temporal proximity of the time when the entity accessed the touchpoint to the occurrence of the relationship event. Alternatively, or in addition, server 110 may allocate the attribution for the relationship event evenly across all of the touchpoints determined in block 304.

In block 314, server 110 determines whether there are any additional touchpoints determined in block 304 that have not been allocated an attribution value. If, in block 314, server 110 determines that there is an additional touchpoint that was determined in block 304 that has not been allocated an attribution value, server 110 moves to block 316. In block 316, server 110 selects the next touchpoint that has not been allocated an attribution value and repeats blocks 308-312 for the selected touchpoint. If, in block 314, server 110 determines that all of the touchpoints determined in block 304 have been allocated an attribution value, server 110 moves to block 318.

In block 318, server 110 provides the attribution values allocated to the touchpoints, such as to the participant. For example, server 110 may provide a graphical display to the participant that presents the aggregated attribution values of each of the touchpoints, such as on one of the electronic devices 102, 104, 106. Alternatively, or in addition, server 110 may store the attribution values allocated to each of the touchpoints, such as in data store 114. In this instance, server 110 may later aggregate the attribution values allocated to the touchpoints across multiple relationship events, such as at a periodic basis.

Figure 4:
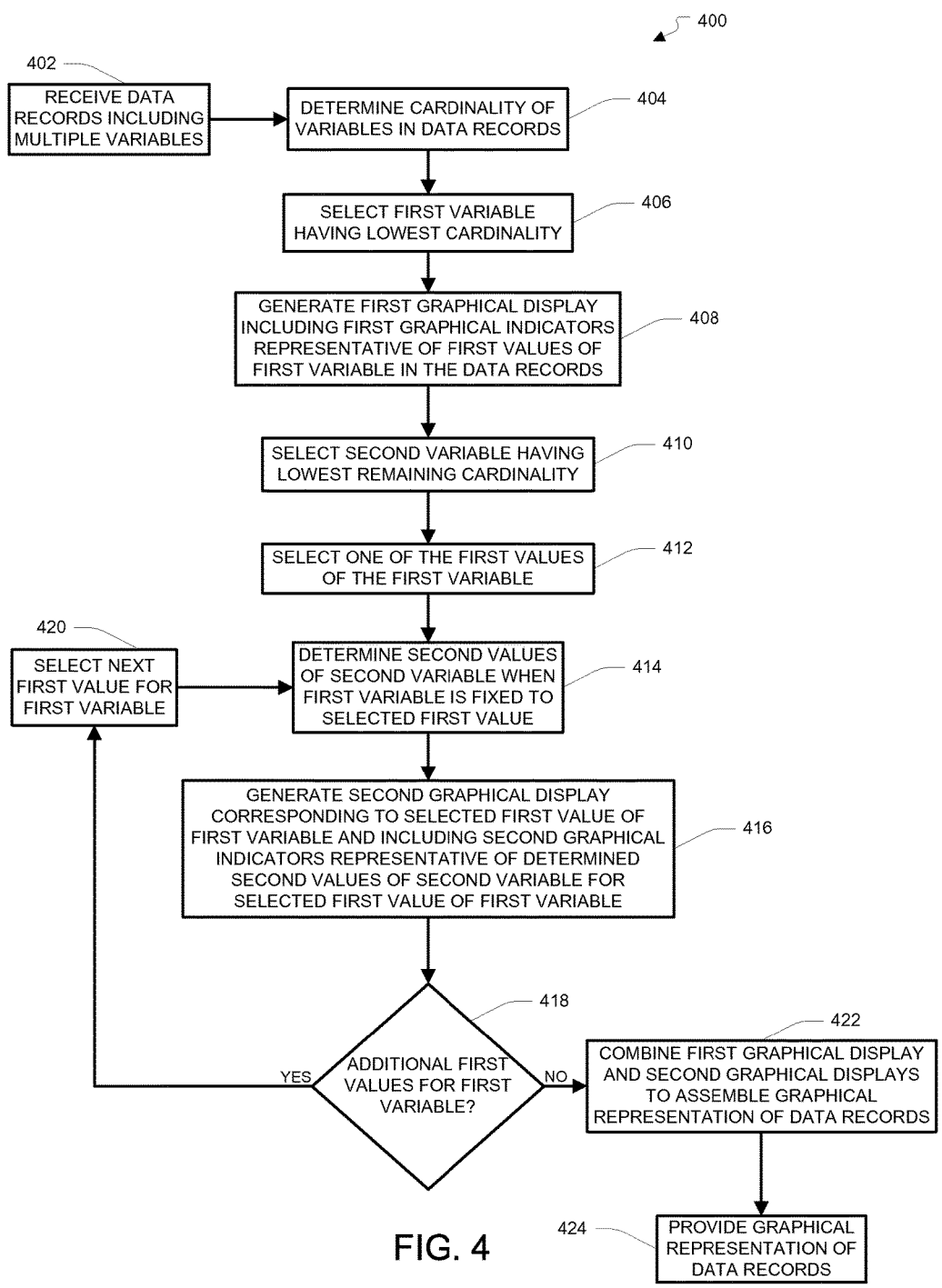
FIG. 4 illustrates a flow diagram of an example process for providing a graphical representation of a multivariate dataset, such as in a user association attribution system.

FIG. 4 illustrates a flow diagram of an example process 400 for providing a graphical representation of a multivariate dataset, such as in a user association attribution system. For explanatory purposes, example process 400 is described herein with reference to the example network environment 100 of FIG. 1; however, example process 400 is not limited to the example network environment 100 of FIG. 1. Further for explanatory purposes, the blocks of example process 400 are described herein as occurring in serial, or linearly. However, multiple blocks of example process 400 may occur in parallel.

In block 402, server 110 receives data records that include multiple variables. For example, server 110 may receive data records that include demographic information corresponding to entities that are presently associated with a participant in the social network. The demographic information may include, e.g. age, gender, ethnicity, etc. In block 404, server 110 determines the cardinality of each of the variables in the data records. For example, server 110 may determine the number of different values corresponding to each of the variables in the data records. In the instance of the gender variable, the number of different values may be limited to "male," "female," or "unknown." Thus, for the gender variable, the maximum cardinality would be three, e.g. when the data records include records pertaining to male, female and unknown users.

Figure 5:
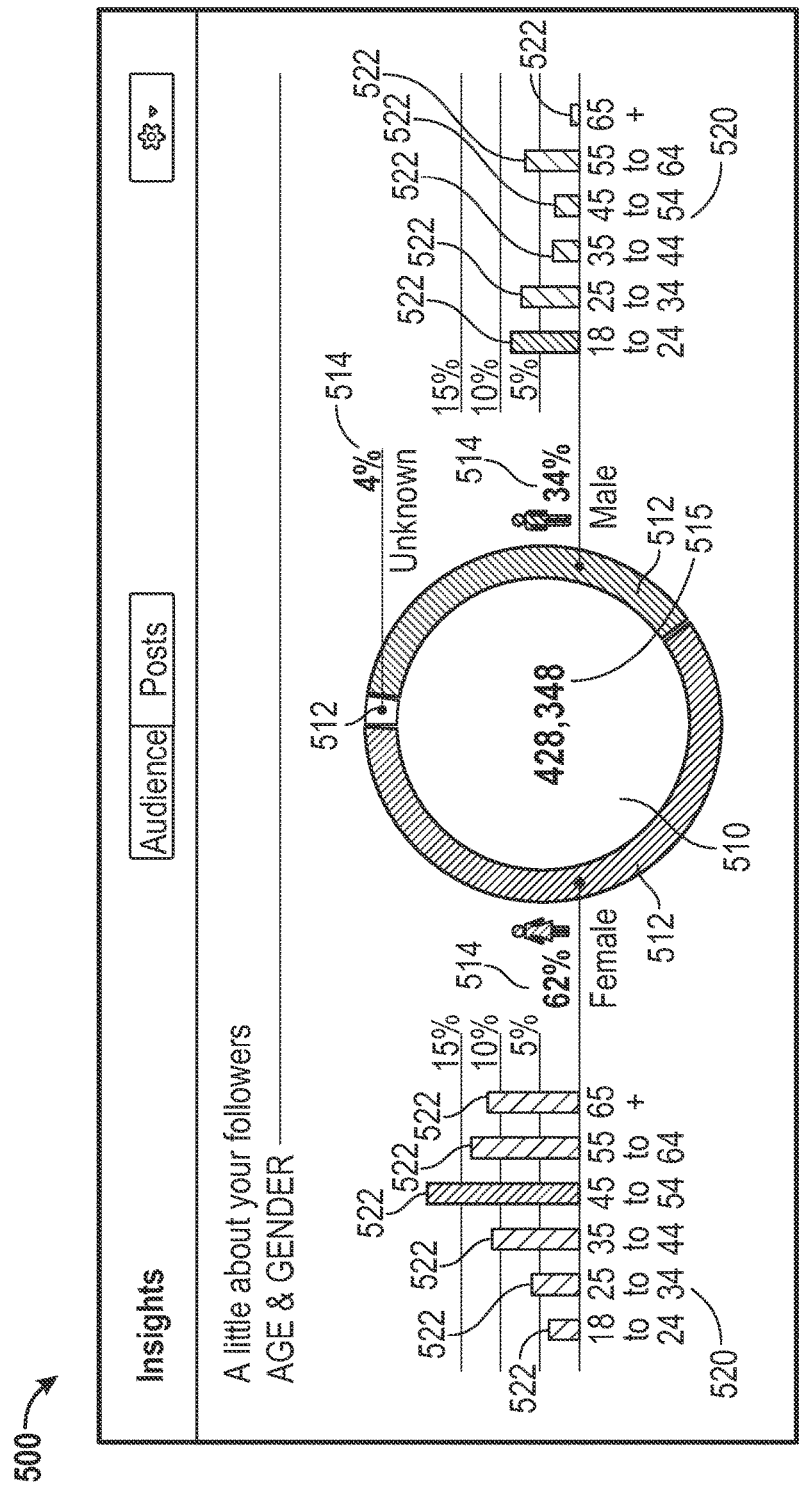
FIG. 5 illustrates an example user interface that includes a graphical representation of a multivariate dataset.

In block 406, server 110 selects the variable of the data records that has the lowest cardinality, such as gender. In block 408, server 110 generates a first graphical display that includes first graphical indicators representative of each of the different values of the first variable in the data records. For example, the first graphical display may be a donut pie chart, as illustrated in FIG. 5, that includes a slice of the donut pie chart that is representative of each different value of the first variable in the data records. In the example illustrated in FIG. 5, the first variable is the gender variable and therefore the donut pie chart includes slices that are representative of the different gender values, e.g. "male," "female," and "unknown."

In block 410, server 110 selects a second variable from the data records that has the lowest remaining cardinality. For example, server 110 may select age, or age groups, as the second variable. In block 412, server 110 selects one of the values of the first variable. In the example of the gender variable, server 110 may select "male," "female" or "unknown." In block 414, server 110 determines the second values of the second variable when the first variable is fixed to the selected first value. Thus, in the example of the gender being selected as the first variable and age, or age groups, being selected as the second variable, server 110 may select the "male" value of the first variable and may determine the age, or age group, values when the gender variable is fixed to "male."

In block 416, server 110 may generate a second graphical display that corresponds to the selected first value of the first variable that includes second graphical indicators that are representative of the determined second values of the second variable for the selected first value of the first variable. For example, if the selected value of the first variable is "male," server 110 may identify the data records for which the gender variable is fixed to "male" and may determine the percentage of the identified data records, relative to the total number of data records, that correspond to each value of the second variable, such as age group. For example, in the user interface illustrated in FIG. 5, the second graphical display is a histogram that includes graphical indicators corresponding to each age group variable value when the gender variable value is fixed to "male."

In block 418, server 110 determines whether there are any additional first values for the first variable that have not been selected. If, in block 418, server 110 determines that there are additional first values for the first variable that have not been selected, server 110 moves to block 420. In block 420, server 110 selects the next first value for the first variable. If, in block 420, server 110 determines that all of the first values of the first variable have been selected, server 110 moves to block 422. In block 422, server 110 combines the first graphical display and each of the second graphical displays to assemble a graphical representation of the data records. For example, server 110 may assemble the graphical representation such that at least two of the second graphical displays are aligned across an axis that runs through the first graphical display. For example, the graphical representation may be part or all of the user interface illustrated in FIG. 5. In block 424, server 110 provides the graphical representation of the data records, such as to a user accessing one of the electronic devices 102, 104, 106.

Alternatively, or in addition, the first variable that is used to generate the first graphical display may be selected by a user, may be selected by an administrator, or may be selected based on any other criteria. Thus, the first graphical display may not always correspond to the variable having the lowest cardinality in the data records. Similarly, the second variable that is used to generate the second graphical displays may be selected by a user, may be selected by an administrator, or may be selected based on any other criteria. Thus, the second graphical displays may not always correspond to the variable having the second lowest cardinality in the data records. Alternatively, or in addition, the number of values of the first variable that are used to generate second graphical displays may be limited, such as to two values. In this instance, only two second graphical displays may be generated.

IV. Example User Interfaces for a User Association Attribution System

FIG. 5 illustrates an example user interface 500 that includes a graphical representation of a multivariate dataset. User interface 500 includes a first graphical display 510, and a second graphical display 520. The first graphical display 510 includes first graphical indicators 512, first magnitude indicators 514, and a total records indicator 515. The second graphical displays 520 each include second graphical indicators 522.

In operation, the user interface 500 may be generated, for example, in accordance with the process described in FIG. 4. For example, the first graphical indicators 512 of the first graphical display 510 may be representative of the percentage of the data records that correspond to each first value, e.g. "male," "female," and "unknown," of the first variable, e.g. gender. The first magnitude indicators 514 may provide the actual magnitude of the percentages corresponding to each first value. The total records indicator 515 may indicate the total number of data records represented in the user interface 500. In some examples, a user's demographic information is not shown unless the user has been given notice and/or has provided assent for such sharing of information.

The second graphical displays 520 may each correspond to one of the values of the first variable of the first graphical display 510. For example, in FIG. 5, the second graphical displays 520 may correspond to the values of "male" and "female" of the first variable, e.g. gender. The second graphical indicators 522 of the second graphical displays 520 may represent the percentage of the total data records that correspond to each second value, e.g. "18 to 24," "25 to 34," "35 to 44," "45 to 54," "55 to 64," and "65+," of the second variable, e.g. age or age group, when the first variable is fixed to the corresponding first value, e.g. "male" or "female."

As shown in FIG. 5, the horizontal axis of the second graphical displays 520 are fixed through the first graphical display 510, such that the second graphical indicators 522 of each of the second graphical displays 520 can be compared with one another. In another example, the user interface 500 may include a second graphical display 520 corresponding to the "unknown" value of the first variable, e.g. gender. However, the second graphical display 520 corresponding to the "unknown" value of the first variable may not be aligned with the second graphical displays 520 corresponding to the "male" and "female" values.

V. Example Systems for User Association Attribution

Figure 6:
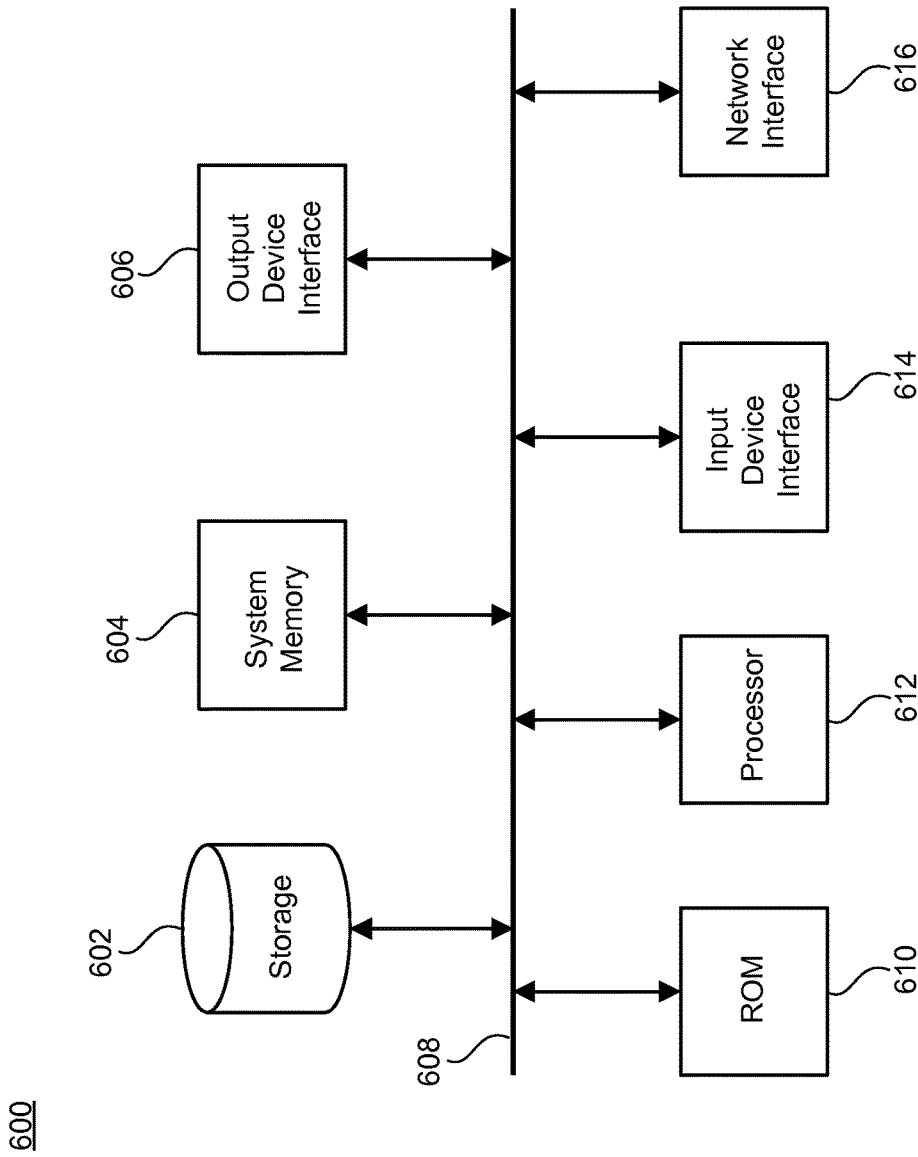
FIG. 6 conceptually illustrates an electronic system with which some implementations of the subject technology may be implemented.

FIG. 6 conceptually illustrates an electronic system with which some implementations of the subject technology are implemented. Electronic system 600 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units may include instructions for user association attribution in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for user association attribution, the method comprising:
   receiving, using one or more computing devices, information pertaining to a plurality of relationship events that each correspond to a new relationship between a participant and one entity of a plurality of entities in an electronic social network, or a dissolution of an existing relationship between the participant and the one entity;

allocating, using the one or more computing devices and for each of the plurality of relationship events, a plurality of attribution values to a plurality of touchpoints accessed by a respective entity of the plurality of entities prior to the relationship event, wherein a positive attribution value is allocated to each of the plurality of touchpoints that correspond to a new relationship and a negative attribution value is allocated to each of the plurality of touchpoints that correspond to a dissolution of an existing relationship;

generating, using the one or more computing devices, an aggregate attribution value for each of the plurality of touchpoints based at least in part on attribution values allocated to each of the plurality of touchpoints; and providing, using the one or more computing devices and to the participant, each aggregate attribution value generated for each of the plurality of touchpoints.

2. The method of claim 1, further comprising:
determining, using the one or more computing devices, the plurality touchpoints accessed by the respective entity prior to each of the plurality of relationship events based at least in part on session information of the respective entity.

3. The method of claim 2, further comprising:
filtering, using the one or more computing devices, the plurality of touchpoints accessed by the respective entity prior to each of the plurality of relationship events to exclude any of the plurality of touchpoints that were accessed by the respective entity outside of an attribution time window prior to each of the plurality of relationship events.

4. The method of claim 1, wherein each of the plurality of attribution values is allocated to each of the plurality of touchpoints for each of the plurality of relationship events based at least in part on a temporal proximity of a time when each of the plurality of touchpoints was accessed to each of the plurality of relationship events.

5. The method of claim 1, wherein the participant in the social network comprises a user participant in the social network or a corporate participant in the social network.

6. The method of claim 1, wherein the entity comprises a user entity in the social network or a corporate entity in the social network.

7. The method of claim 1, wherein at least one of the plurality of touchpoints comprises content generated or controlled by the participant or a reference to the content generated or controlled by the participant.

8. The method of claim 1, wherein the at least one of the plurality of touchpoints comprises at least one of a badge, a post, a search result, or content external to the social network.

9. The method of claim 1, further comprising:
correlating, using the one or more computing devices, each of the plurality of attribution values allocated to each of the plurality of touchpoints accessed by the respective entity based at least in part on demographic information of the respective entity; and
providing, using the one or more computing devices, a graphical representation of the correlated plurality of attribution values.

10. The method of claim 1, further comprising:
weighting, using the one or more computing devices, each of the plurality of attribution values allocated to each of the plurality of touchpoints based at least in part on each of the plurality of relationship events for which each of the plurality of attribution values was allocated, wherein the aggregate attribution value for each of the plurality of touchpoints is generated based at least in part on the weighted attribution values allocated to each of the plurality of touchpoints.

11. The method of claim 10, wherein a first weighted value is determined for each of the plurality of attribution values that was allocated for each association event of the plurality of relationship events and a second weighted value is determined for each of the plurality of attribution values that was allocated for each disassociation event of the plurality of relationship events.

12. The method of claim 11, wherein the first weighted value comprises a positive value and the second weighted value comprises a negative value.

13. A computer-implemented method for user association attribution, the method comprising:
receiving, using one or more computing devices, an indication of a relationship event corresponding to one of a new relationship between a participant and an entity in and an electronic social network, or a dissolution of an existing relationship between the participant and the entity;
determining, using the one or more computing devices and from session information corresponding to the entity, a plurality of touchpoints accessed by the entity within an attribution time window prior to the relationship event and a time when each of the plurality of touchpoints was accessed by the entity;
allocating, using the one or more computing devices, an attribution value to each of the plurality of touchpoints based at least in part on a temporal proximity of the relationship event to the time when each of the plurality of touchpoints was accessed by the entity, wherein the allocated attribution value for each of the plurality of touchpoints comprises a positive attribution value when the relationship event corresponds to a new relationship and the allocated attribution value for each of the touchpoints comprises a negative attribution value when the relationship event comprises a dissolution of an existing relationship; and
providing, using the one or more computing devices and to the participant, the attribution value allocated to each of the plurality of touchpoints corresponding to the relationship event.

14. The method of claim 13, wherein the positive attribution value comprises a positive sign and the negative attribution value comprises a negative sign.

15. The method of claim 13, wherein the attribution value allocated to each of the plurality of touchpoints decreases proportionally to a decrease in the temporal proximity of the relationship event to the time when each of the plurality of touchpoints was accessed by the entity.

16. The method of claim 13, wherein the participant in the social network comprises a user participant in the social network or a corporate participant in the social network.

17. The method of claim 13, wherein the entity comprises a user entity in the social network or a corporate entity in the social network.

18. The method of claim 13, wherein at least one of the plurality of touchpoints comprises content generated or controlled by the participant, or a reference to the content generated or controlled by the participant.

19. The method of claim 13, wherein the at least one of the plurality of touchpoints comprises at least one of a badge, a post, a search result, or content external to the social network.

20. A system, comprising:
one or more processors; and
a memory including instructions that, when executed by the one or more processors, cause the one or more processors to:
receive information pertaining to a plurality of relationship events that each correspond to a new relationship between a participant and one entity of a plurality of entities in an electronic social network, or a dissolution of an existing relationship between the participant and the one entity;
allocate, for each of the plurality of relationship events, a plurality of attribution values to a plurality of touchpoints accessed by a respective entity of the plurality of entities prior to the relationship event, wherein a positive attribution value is allocated to each of the plurality of touchpoints that correspond to a new relationship and a negative attribution value is allocated to each of the plurality of touchpoints that correspond to a dissolution of an existing relationship;
generate an aggregate attribution value for each of the plurality of touchpoints based at least in part on attribution values allocated to each of the plurality of touchpoints; and
provide, to the participant, each aggregate attribution value generated for each of the plurality of touchpoints.

21. The system of claim 20, wherein the instructions, when executed, further cause the one or more processors to:
weighting each of the plurality of attribution values allocated to each of the plurality of touchpoints based at least in part on each of the plurality of relationship events for which each of the plurality of attribution values was allocated,
wherein the aggregate attribution value for each of the plurality of touchpoints is generated based at least in part on the weighted attribution values allocated to each of the plurality of touchpoints.

22. The system of claim 21, wherein a first weight comprising a positive value is determined for each of the plurality of attribution values that was allocated for each association event of the plurality of relationship events and a second weight comprising a negative value is determined for each of the plurality of attribution values that was allocated for each disassociation event of the plurality of relationship events.

23. A non-transitory machine-readable medium embodying instructions that, when executed by a machine, allow the machine to perform a method for user association attribution, the method comprising:
receiving an indication of a relationship event corresponding to one of a new relationship between a participant and an entity in and an electronic social network, or a dissolution of an existing relationship between the participant and the entity;
determining, from session information corresponding to the entity, a plurality of touchpoints accessed by the entity within an attribution time window prior to the relationship event and a time when each of the plurality of touchpoints was accessed by the entity;
allocating an attribution value to each of the plurality of touchpoints based at least in part on a temporal proximity of the relationship event to the time when each of the plurality of touchpoints was accessed by the entity, wherein the allocated attribution value for each of the plurality of touchpoints comprises a positive attribution value when the relationship event corresponds to a new relationship and the allocated attribution value for each of the touchpoints comprises a negative attribution value when the relationship event comprises a dissolution of an existing relationship; and
providing, to the participant, the attribution value allocated to each of the plurality of touchpoints corresponding to the relationship event.

24. The non-transitory machine-readable medium of claim 23, wherein the positive attribution value comprises a positive sign and the negative attribution value comprises a negative sign.

25. The non-transitory machine-readable medium of claim 23, wherein the attribution value allocated to each of the plurality of touchpoints decreases proportionally to a decrease in the temporal proximity of the relationship event to the time when each of the plurality of touchpoints was accessed by the entity.

* * * * *